(12) United States Patent
Schmidt et al.

(10) Patent No.: US 10,496,179 B2
(45) Date of Patent: Dec. 3, 2019

(54) SYSTEM AND METHOD FOR PROCESSING VALUE DOCUMENTS

(71) Applicant: GIESECKE+DEVRIENT CURRENCY TECHNOLOGY GMBH, München (DE)

(72) Inventors: Alfred Schmidt, München (DE); Michael Stapfer, Neubiberg (DE); Manfred Hertel, München (DE); Matthias Langlotz, Hohenbrunn (DE); Bernhard Eisen, München (DE)

(73) Assignee: GIESECKE+DEVRIENT CURRENCY TECHNOLOGY GMBH, Munich (DE)

( * ) Notice: Subject to any disclaimer, the term of this patent is extended or adjusted under 35 U.S.C. 154(b) by 0 days.

(21) Appl. No.: 15/573,238

(22) PCT Filed: May 20, 2016

(86) PCT No.: PCT/EP2016/000848
§ 371 (c)(1),
(2) Date: Nov. 10, 2017

(87) PCT Pub. No.: WO2016/188627
PCT Pub. Date: Dec. 1, 2016

(65) Prior Publication Data
US 2018/0137714 A1 May 17, 2018

(30) Foreign Application Priority Data
May 22, 2015 (DE) .......................... 10 2015 006 664

(51) Int. Cl.
*G06F 3/01* (2006.01)
*G07D 11/22* (2019.01)
(Continued)

(52) U.S. Cl.
CPC ............. *G06F 3/017* (2013.01); *G07D 11/16* (2019.01); *G07D 11/20* (2019.01); *G07D 11/22* (2019.01);
(Continued)

(58) Field of Classification Search
CPC ........... G07D 11/0036; G07D 11/0084; G07D 11/0051; G07D 11/0021; G07D 2211/00; G06F 3/017; G06F 3/04842
See application file for complete search history.

(56) References Cited

U.S. PATENT DOCUMENTS 6,771,294 B1 * 8/2004 Pulli ....................... G06F 3/011
345/173
8,958,626 B1 * 2/2015 Mennie .............. G06K 9/00469
382/135
(Continued)

FOREIGN PATENT DOCUMENTS

DE       10154342 A1    5/2003
DE   102012014995 A1    4/2014
(Continued)

OTHER PUBLICATIONS

German Search Report from DE Application No. 10 2015 006 664.1, dated Apr. 18, 2016.
(Continued)

*Primary Examiner* — Premal R Patel
(74) *Attorney, Agent, or Firm* — Workman Nydegger

(57) ABSTRACT

A system and a corresponding method for processing value documents, including bank notes, includes an apparatus for processing, for conveying and/or checking and/or counting and/or sorting value documents and a portable user interface configured for receiving information pertaining to the apparatus and/or the processing of the value documents, capturing one or several images, in particular of the apparatus, and
(Continued)

reproducing the received information and/or captured images.

20 Claims, 3 Drawing Sheets

(51) Int. Cl.
    *G07D 11/16*     (2019.01)
    *G07D 11/20*     (2019.01)
    *G07D 11/50*     (2019.01)
    *G06F 3/0484*     (2013.01)

(52) U.S. Cl.
    CPC .......... *G07D 11/50* (2019.01); *G06F 3/04842* (2013.01); *G07D 2211/00* (2013.01)

(56) References Cited

U.S. PATENT DOCUMENTS

| | | | | |
|---|---|---|---|---|
| 2003/0110110 A1* | 6/2003 | Dietz | ..................... | G06Q 40/00 705/35 |
| 2014/0168056 A1* | 6/2014 | Swaminathan | .... | G06K 9/00604 345/156 |
| 2014/0267012 A1* | 9/2014 | Mullins | ................... | G06F 3/013 345/156 |
| 2014/0267399 A1* | 9/2014 | Zamer | ..................... | H04L 67/20 345/633 |
| 2016/0314621 A1* | 10/2016 | Hill | ........................... | G06T 7/73 |

FOREIGN PATENT DOCUMENTS

| | | |
|---|---|---|
| DE | 102012219814 A1 | 4/2014 |
| DE | 102013014889 A1 | 3/2015 |
| EP | 2642331 A1 | 9/2013 |

OTHER PUBLICATIONS

International Preliminary Report on Patentability from PCT Application No. PCT/EP2016/000848, dated Nov. 28, 2017.
International Search Report from PCT Application No. PCT/EP2016/000848, dated Aug. 22, 2016.

* cited by examiner

SYSTEM AND METHOD FOR PROCESSING VALUE DOCUMENTS

BACKGROUND

This invention relates to a system and a method for processing value documents, in particular bank notes, according to the independent claims.

In bank-note processing systems, bank notes are checked with regard to various properties, such as printed image, denomination, authenticity and state, and treated differently depending on the result of the check. For example, bank notes classified as authentic upon the check are returned to circulation provided they simultaneously meet certain fitness criteria. In contrast, bank notes classified as false or suspect are taken out of circulation, and soiled, worn or defective bank notes are fed to a shredder for destruction.

In spite of the high level of automation upon processing bank notes, an interaction between an operator and the bank note processing system is normally necessary to monitor the operating state of the system or the processing of the bank notes and, where applicable, to allow the input of control commands for controlling the processing. The user interfaces usually provided here do not in all cases of application have the necessary degree of ergonomics, however.

SUMMARY

It is the object of the invention to state a system as well as a method for processing value documents, which enables a communication between operator and processing apparatus improved with respect to ergonomics.

The system for processing value documents, in particular bank notes, according to the invention, has an apparatus for processing, in particular for conveying and/or checking and/or counting and/or sorting, value documents and a portable user interface configured for receiving information pertaining to the apparatus and/or the processing of the value documents, capturing one or several images, in particular of the apparatus, and reproducing the received information and/or captured images.

In the methods for processing value documents, in particular bank notes, according to the invention, value documents are processed in an apparatus, in particular are conveyed and/or checked and/or counted and/or sorted, information pertaining to the apparatus and/or the processing of the value documents is received by a portable user interface, one or several images, in particular of the apparatus, are captured by the portable user interface and the received information and/or captured images are reproduced by the portable user interface.

The invention is based on the approach of providing one or several user interfaces for the operation of value-document processing apparatuses, which user interfaces are arranged so as to be mobile or portable, i.e. can be carried or taken along by an operator, and receive information, capture images, and can reproduce the received information and/or captured images. The received information is in particular information pertaining to the value-paper processing apparatus to be operated, e.g. the operating state thereof, and/or the processing of value documents, e.g. beginning and end of the processing or value-paper jam, in the apparatus to be operated. The user interface is configured in particular for capturing images of the apparatus and/or of actions performed by an operator in connection with the processing of the value documents.

For example, the portable user interface can be arranged such that the received information is reproduced in the visual field of an operator, so that the operator when looking, for example, at a portion of the processing apparatus gets additional information displayed which is connected with the respectively viewed portion of the apparatus. The visual field of an operator is understood here to be all central and peripheral points and objects of the exterior space, which when looking in a direction straight on and/or obliquely can be perceived visually, even without staring at them directly.

In another exemplary configuration the portable user interface is arranged as a mobile end device, such as e.g. as a tablet computer or smartphone, at the display of which an image of a portion of the processing apparatus captured with the mobile end device is reproduced together with pertaining additional information.

In both cases the operator thus obtains additional information in addition to the portion respectively viewed or image taken of the portion of the apparatus, without having to look away from the viewed portion or from the viewed image of the portion and to look in the direction of a display device possibly located at the apparatus itself. This is of particular advantage in situations in which the operator is prompted or instructed by means of additional information to execute certain actions, for example, upon the remedying of a jam occurred upon processing the value papers.

Depending on the concrete configuration of the user interface, the non-stationary visual field of the operator or the non-stationary field of vision of a camera provided at the user interface for image capture forms an output area movable with the eye of the operator or the field of vision of the camera for visually outputting additional information, so that the pertaining additional information is especially easy to capture by the operator.

The invention thus improves the communication between operator and processing apparatus with respect to ergonomics.

Preferably, the portable user interface is arranged to enable an input and/or selection of information, in particular for controlling the apparatus, by an operator. This allows the apparatus to be operated by the operator from any arbitrary place.

It is further preferred that the portable user interface has a display device mountable at the head of an operator, in particular in the form of glasses, which is configured for visually reproducing the received information in at least a part of the visual field of the operator. The user interface is preferably configured as a so-called head-mounted display (HMD) by which images, symbols, or other signs are represented on a display near the eye or are projected by means of virtual retinal display directly onto the retina. Depending on the concrete configuration, the HMD are data glasses or video glasses, a helmet display or a virtual reality helmet (VR helmet).

In a further preferred configuration, the portable user interface has a camera which is configured for capturing images of objects located in the visual field of the operator. Preferably, the portable user interface is configured for recognizing a gesture made by the operator, in particular a hand gesture, in the images captured in particular with the camera, and to derive therefrom corresponding information, in particular for controlling the apparatus. By such a gesture control there can be inputted data or control commands in a comfortable manner, without the operator having to be in the reach of a display device, e.g. a touch screen, mounted to the apparatus.

Preferably, the portable user interface is further configured for reproducing an input scheme, in particular in the form of a keyboard or symbols, in the visual field of the operator, and for recognizing in the captured images a gesture of an input and/or selection made by the operator with respect to the reproduced input scheme, and for deriving therefrom respective information, in particular for controlling the apparatus. It is preferred that the portable user interface has a projection device which is configured for projecting the input scheme onto an area, in particular a hand of the operator or an area in the environment of the operator. The projection device is configured e.g. as a laser projector with which by means of laser beam a virtual keypad or symbol is projected onto an area. In this way, the operator has the input scheme, e.g. in the form of a keyboard or of symbols, always in the visual field when inputting and can perform data input or selection by respective hand gestures, such as e.g. a virtual tapping on the symbol or a key reproduced in the visual field.

In a further preferred configuration, the portable user interface is configured for capturing an image of an object located in the visual field of the operator, in particular of a value document, a transport container for value documents or a separator card, and for ascertaining additional information located on the object with the help of the captured image. For example, the additional information is applied on the object as coded information, e.g. in the form of bar codes, or in plaintext, such as e.g. in the form of alphanumeric characters. The user interface additionally opens up thereby the possibility of machine capturing additional information located on objects.

Preferably, the portable user interface is arranged as a mobile end device, in particular as a tablet computer, data glasses or smartphone, which is configured for capturing at least one image of the apparatus or of a part of the apparatus and for reproducing the received information pertaining to the apparatus or the part of the apparatus and/or the processing of the value documents together with the captured image of the apparatus. In analogy to a head-mounted device, the operator thus obtains additional information in addition to the image respectively taken of the apparatus, without having to look away from the viewed image onto a display device possibly located at the apparatus itself.

BRIEF DESCRIPTION OF THE DRAWINGS

Further advantages, features and application possibilities of the present invention will result from the subsequent description in connection with the Figures. There are shown.

DETAILED DESCRIPTION OF VARIOUS EMBODIMENTS

Figure 1:
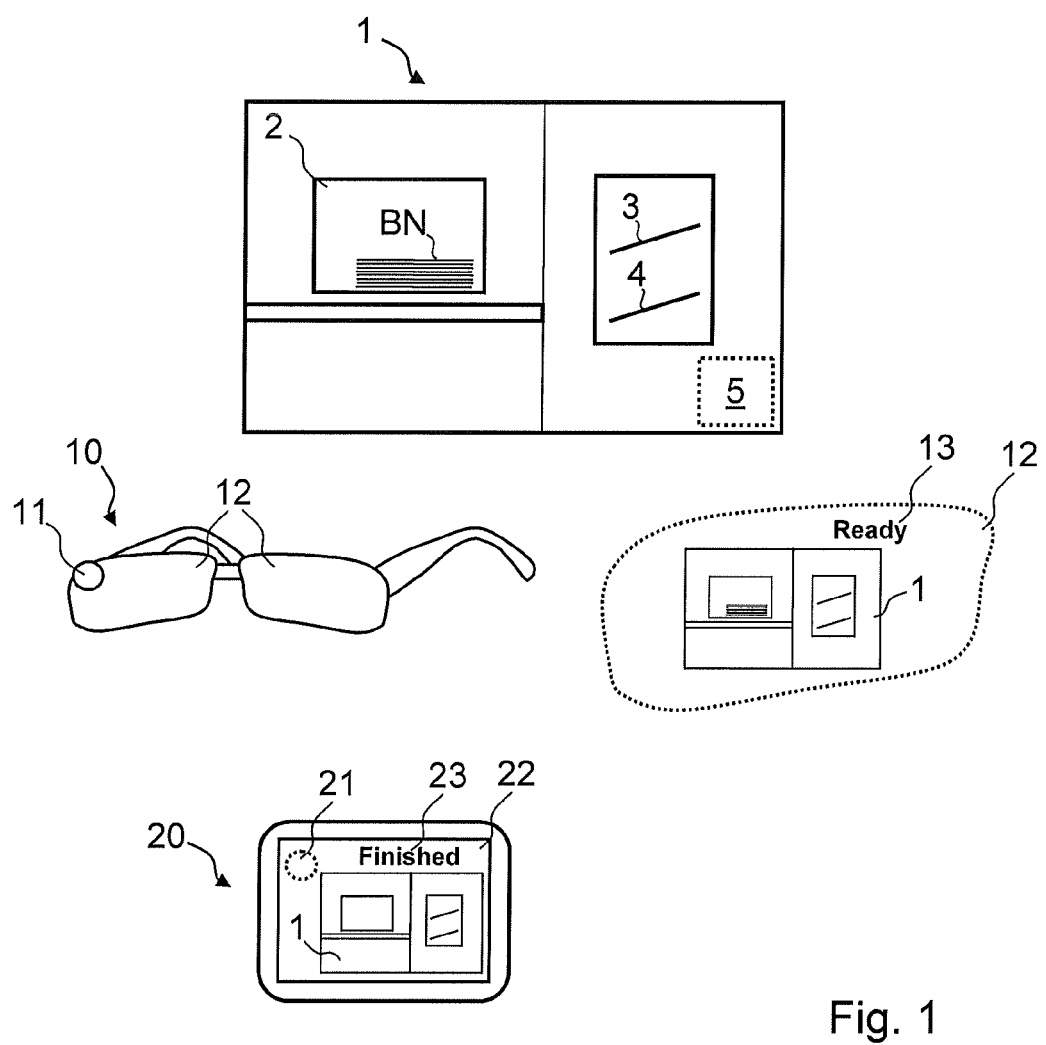
FIG. 1 an example of a system for processing value documents.

FIG. 1 shows an example of a system for processing value documents having a value-document processing apparatus 1 which in the following is also referred to as "apparatus", and at least one portable user interface which in the present example is configured as so-called data glasses 10 and/or a tablet computer 20.

The apparatus 1 has an input pocket 2 in which one or several stacks of value documents to be processed, in particular bank notes BN, can be inputted by an operator or an input device provided for this purpose and be made available for the further processing.

With the help of a singler respectively one bank note of the inputted stack is drawn off and delivered to a transport device which conveys the bank note to a sensor device in which the physical properties thereof are captured and properties of the bank note, such as for example printed image, denomination, authenticity and state, are derived therefrom. In dependence on the properties ascertained the bank note is supplied to an output pocket 3 or 4 and deposited there. Optionally, there can also be provided a shredder to which bank notes having certain properties, such as e.g. insufficient fitness, are forwarded directly for destruction.

The operations upon processing bank notes BN in the apparatus 1, described above only very roughly, are controlled by a control device 5 which is in a preferably contactless data communication with the user interface 10 or 20 at which information regarding the bank note processing operation and/or instructions directed to an operator are reproduced visually, on the one hand, and data and/or control commands for controlling the bank note processing in the apparatus 1 can be inputted by the operator, on the other hand. A wireless data connection between control device 5 and user interface 10 or 20 can be effected, for example, by means of Bluetooth standard or WLAN.

A user interface configured as data glasses 10 has a carrier that is substantially formed in glasses-like manner at which a camera 11 is provided for taking images of the environment. The camera 11 is preferably disposed and/or arranged such that in particular an environment region lying in the visual field of the operator carrying the data glasses 10 is taken.

The data glasses 10 further have a display device 12, in the present example only schematically indicated, by which information which, for example, is transmitted from the control device 5 to the data glasses 10 is reproduced visually, so that the operator can perceive this information.

For this purpose, the display device 12 may be configured, for example, as a semitransparent display which enables the operator's direct view onto the environment, in particular onto the apparatus 1, on the one hand, and an inserting of additional information into the visual field of the operator, on the other hand.

Depending on the case of application, it may be advantageous to provide the display device 12 merely in certain regions of the visual field of the operator, such as for example in the edge region, and/or to drive the display device 12 in such a way that it outputs information only in certain regions of the visual field of the operation, such as for example the edge region.

It is further possible to arrange the display device 12 as a projection device by which the information to be respectively reproduced is projected directly onto the eye or the retina of the operator.

Regardless of the concrete configuration of the display device 12, additional information 13 can be visualized in the visual field of the operator in this way—and thus independent of the actual viewing direction—and be viewed by the operator together with the respectively viewed object, in the represented example the apparatus 1.

For illustrative reasons, in the present representation there is represented merely the operator's view through the left spectacle glass frame and the additional information 13 reproduced by means of display device 12. If also the right spectacle glass frame of the data glasses 10 is provided with a corresponding display device 12, the operator can perceive also with the right eye the respective additional information 13 in addition to the apparatus 1.

The data glasses 10 can basically be any type of display devices mountable at the head of an operator, so-called head-mounted display (HMD), which insert information and/or images into the visual field of the operator and thus deliver additional information to the operator.

Optionally, the data glasses 10 can be equipped with movement sensors to synchronize the image respectively fed or the additional information with the head or eye movement of the operator.

Basically, the data glasses 10 can be additionally designed to output language and other contextual acoustic information.

Alternatively or additionally to the data glasses 10, as a user interface there can be used a mobile end device, for example in the form of a tablet computer 20 or a smartphone, which has, besides a camera 21 located on the back side, a display 22 located on the front side at which the images captured with the camera 21 can be reproduced. In the present example, the display 22 shows an image taken of the total apparatus 1 together with additional information 23 pertaining to the apparatus 1 or the processing operation running in the apparatus 1.

The user interface 10 or 20 is preferably arranged and/or is preferably controlled in such a way that additional information 13 or 23 is reproduced in dependence on the viewing direction of the operator and/or of the camera 11 or 21. The additional information 13 or 23 respectively displayed depends here preferably on which object, in particular which portion or part of the apparatus 1, is viewed by the operator or is taken by means of camera 11 or 21. This brings information respectively pertaining to the viewed region of the apparatus 1 or to the region captured with the camera 11 or 21 to the operator's attention in an easily capturable manner. For example, at the user interface 10 or 20 there can be displayed data regarding the currently observed processing operation or there can be given indications, e.g. that the currently viewed output pocket 3 or 4 is to be emptied or that bank notes are to be added in the input pocket 2 in a short time. The operator therefore does not need to look at a display possibly provided at the housing of the apparatus 1, so as to be able to take note of for example error messages or state messages of the apparatus 1 or action instructions.

Further, with the help of a such arranged user interface 10 or 20 it is also possible to give to an operator support in carrying out repair work at the apparatus 1 within the framework of a so-called remote service, by the images respectively taken by the camera 11 or 21 being transmitted to a service station located at a remote site and there being examined by a service assistant who then gives to the operator at the particular apparatus 1 on site the instructions necessary for the repair work in the form of inserted information 13 or 23 and/or acoustic information.

Alternatively or additionally to the above-described configuration possibilities of the data glasses 10, it is also possible to record the activities executed by the operator in connection with the operation of the apparatus 1 with the camera 11 located at the data glasses 10 and to allocate and store this together with other processing data as a video stream to the respective deposit in a data bank (not represented) so that any manipulations by the operator can also be reliably retraced afterwards. In this embodiment, it may be desirably that during the recording of the activities of the operator a corresponding symbol, for example, "REC", is reproduced visually in the display device 12 of the data glasses 10.

As already mentioned, the user interface 20 is not only configured to reproduce additional information in the visual field of the operator or together with the image taken of the apparatus 1, but is preferably also designed to enable an input or selection of information, in particular in the form of control commands for controlling the apparatus 1, by an operator. This is described in more detail in the following.

For this purpose the data glasses 10 are preferably configured for capturing with the camera 11 a gesture made in the visual field of the operator and to interpret or identify it as information to be inputted.

Figure 2:
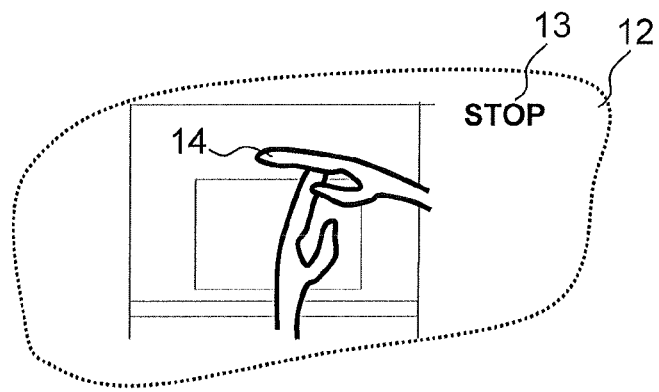
FIG. 2 a first example of a hand gesture in the visual field of an operator.

FIG. 2 shows a first example of a hand gesture 14 made by an operator, which is recorded by the camera 11 and is interpreted in an evaluation device (not represented) as a stop command which in the present example is confirmed by outputting "STOP" as an additional information 13 in the visual field of the operator.

Figure 3:
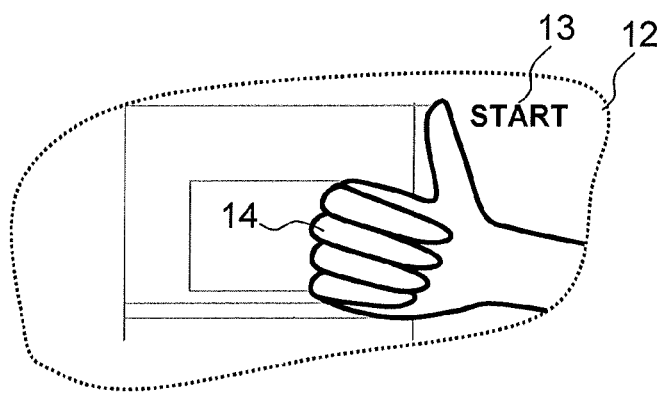
FIG. 3 a second example of a hand gesture in the visual field of an operator.

The second example of a hand gesture 14 shown in FIG. 3, in contrast, is identified as a start command which is also confirmed by a visual reproduction of a corresponding additional information 13 ("START").

By a preferably wireless transmission of the respectively identified control commands to the control device 5 there can be effected control of the apparatus 1 corresponding to the respectively inputted commands.

Figure 4:
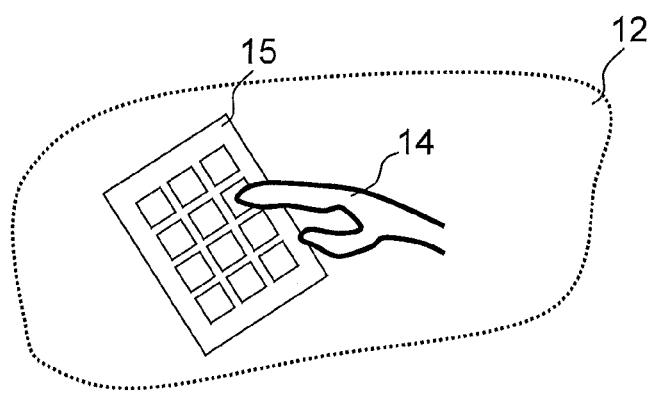
FIG. 4 an example of an input scheme reproduced in the visual field of an operator.

Alternatively or additionally to the above-described gesture control, the data glasses 10 can be configured, as shown in FIG. 4 by way of example, for visualizing an input scheme 15 in the visual field of the operator, for capturing the gestures 14 executed by the operator with respect to the input scheme to 15 by means of camera 11, and for deriving therefrom the information to be respectively inputted.

In the present example the inserted input scheme 15 has the form of a keyboard or a numeric keypad which is projected, for example, by means of a projection device onto an arbitrary area in the visual field of the operator, for example a table area or also a palm area of the operator.

However, alternatively it is also possible to visualize the input scheme 15 with the help of the display device 12 described above already in more detail.

Alternatively or additionally to a keyboard for the input of letters or numbers, the input scheme 15 may also include, however, selection elements arranged in symbol-like manner, so-called icons, whose virtual activation by means of hand gesture 14 can select a corresponding function or instruction for controlling the apparatus 1.

Analogously to the above-described display of additional information in the visual field, which is independent of the actual view of the operator, in this embodiment there is likewise achieved the advantage that the operator does not have to look in the direction of an input element possibly located at the housing of the apparatus 1 and to operate it by touching it with the hand, instead an input or selection of information independent of the actual view of the operator and without being bound to a stationarily disposed input element is possible.

Figure 5:
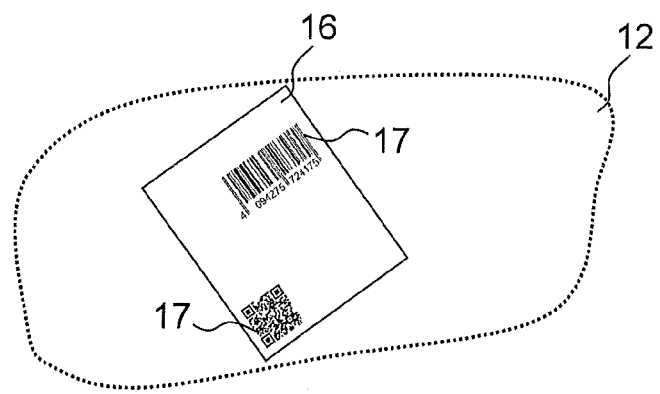
FIG. 5 an example of an object located in the visual field of an operator, which has additional information in the form of bar codes located thereon.

FIG. 5 shows an example of an object 16 located in the visual field of an operator, which has additional information in the form of bar codes 17 located thereon. The object 16 can be, for example, a value document, a transport container for value documents, or a separator card for separating different deposits of value documents or bank notes. Preferably, the data glasses 10 can be designed to capture the object 16 including the bar codes 17 or any other coded or uncoded information located thereon, which object is located in the visual field of the operator, and to ascertain data contained in the bar codes 17 or in the other information with the help of the captured images. The data obtained thereby can be reproduced, for example, at the display device 12 in the above-described manner and/or forwarded to the control device 5 or a memory device (not represented) for further processing or storage. The data glasses 10 in this embodiment thus assumes also the function of a data scanner. Preferably, the data glasses 10 are arranged such that a scan process can be started and/or terminated by a gesture, in particular hand gesture, and/or a voice command of the operator.

Figure 6:
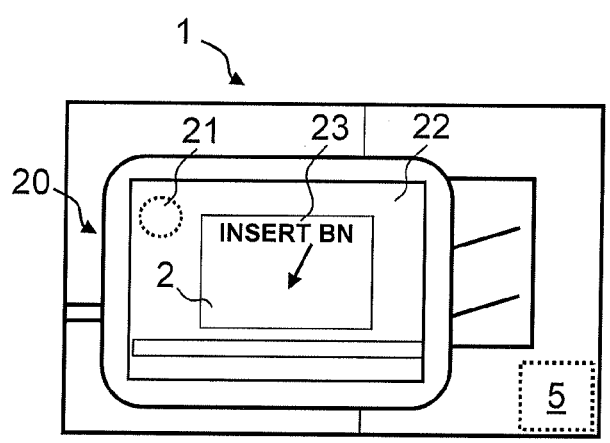
FIG. 6 an example of a case of application of a system for processing value documents having a user interface in the form of a mobile end device.

Preferred configurations of the portable user interface were described above in connection with the FIGS. 2 to 5 with reference to data glasses 10 accordingly arranged. However, the statements hereinabove also apply accordingly to a mobile end device, for example in the form of a tablet computer 20 or a smartphone, what is explained by way of example with reference to a case of application shown in FIG. 6, in which as a portable user interface there is used a mobile end device in the form of a tablet computer 20. In the represented example, by the camera 21 located on the back side of the tablet computer 20 there is taken an image of the region of the input pocket 2 of the apparatus 1 and reproduced at the display 22. The tablet computer 20 and/or the control device 5 here is arranged in such a way that any information pertaining to the input pocket 2 is displayed together with the image of the pertaining portion of the apparatus 1 reproduced on the display 22. In the shown example, the message "INSERT BN" is displayed in the reproduced image together with an arrow, thereby prompting the operator to add a bank-note stack into the input pocket 2, in order to make this bank-note stack available for further processing.

The additional information displayed by the display device 12 or 22 may also be, for example, deposit-related additional information regarding bank notes which are provided for a so-called manual post-processing, such as for example special rejection reasons, such as a missing security feature or serial number.

Alternatively or additionally, the display device 12 or 22 can also be designed to display image information regarding an individual bank note obtained with a sensor device provided in the apparatus 1, such as for example a magnetic image or an infrared image. Alternatively or additionally, at the display device 12 or 22 there can also be reproduced images which were recorded with an infrared camera installed at a manual post-processing station for checking suspect bank notes. Altogether, this can accelerate the manual rework, improve a recognition of forgeries and, not least, reduce the tiredness of the operating staff.

By means of data glasses 10 and/or mobile end devices 20 the operator does not only see the respectively viewed reality, for example in the form of a portion of the apparatus 1, but also relevant additional information which extends the reality virtually, which is why in connection with the user guidance or operation of the apparatus 1 by the portable user interface 10 or 20 one can also speak of "augmented reality" or "virtual reality". So as to insert virtual information correctly positioned and in real time into the respective real scene, preferably three steps are passed through: image taking and image processing, recognition of position and image reproduction (so-called rendering). In so doing, the camera images are first read in and by image processing algorithms freed from disturbing influences and processed for the subsequent treatment. With the help of the features found in the camera image taken, as for example parts of an image known before, the relation between camera and recognized area is calculated. This calculation forms the basis for the correctly positioned representation of the augmented reality elements, i.e. of the respective information additionally inserted. Consistent with the viewed scene, the virtual scene elements are reproduced in the camera image and the accordingly extended reality becomes visible to the viewer. Preferably, the three described steps are repeated approx. 30 times per second. In so doing, a perspectively always correct representation of the pertaining information is guaranteed.

Alternatively or additionally to the above-described cases of application, the portable user interface 10 or 20 can also be employed for monitoring the flow of material in a so-called cash center, by the respective stock being pursued and/or the bank note throughput in the different departments, the storage handling as well as the coordination by staff and goods being monitored. The statements in connection with the examples shown in the FIGS. 1 to 6 will apply accordingly here.

The portable user interface 10 or 20 according to the present invention can completely replace, depending on the configuration, an operator display having touch screen usually provided at the equipment of the apparatus 1. The interactions usually performed at the operator display at the apparatus 1 can be carried out completely via the mobile user interface 10 or 20, such as for example inserting a message, a menu selection by capturing the viewing direction of the operator or of the camera 11 or 21 as well as acknowledging the message by respective inputs, such as for example hand gestures, blinking or voice inputs.

Alternatively or additionally to the visual reproduction of information pertaining to the current processing operation, the user interface 10 or 20 can also be configured for outputting auxiliary information for the operator or a service engineer, for example in the form of a video sequence or of operating indications for the sequence of hand movements. It is further possible to display contextual information from the service or instruction manual of the apparatus 1. In connection with repair work or maintenance work it can further be of advantage, for example, to display setting points or thermographic images for recognizing a possibly overheated bearing or a noise source, for example as a result of a broken bearing.

The invention claimed is:

1. A system for processing value documents, the system comprising:
    an apparatus that processes value documents, the apparatus including a first functional portion and a second functional portion, said first and second functional portions including a conveying portion, a checking portion, a counting portion, and/or a sorting portion configured to respectively convey, check, count, and sort the value documents in the processing of the value documents; and
    a portable user interface which is configured to
       receive information pertaining to each of the first functional portion and the second functional portion of the apparatus or the processing of the value documents at the first functional portion and the second functional portion, capture one or several images of the first functional portion of the apparatus, capture one or several images of the second functional portion of the apparatus, reproduce the received information pertaining to the first functional portion of the apparatus or the processing of the value documents at the first functional portion and the captured one or several images of the first functional portion of the apparatus such that the received information pertaining to the first functional portion of the apparatus is reproduced to spatially correspond with the first functional portion of the apparatus in the reproduced one or several images of the first functional portion of the apparatus, and reproduce the received information pertaining to the second functional portion of the apparatus or the processing of the value documents at the second functional portion and the captured one or several images of the second functional portion of the apparatus such that the received information pertaining to a second functional portion of the apparatus is reproduced to spatially correspond with the second functional portion of the apparatus in the reproduced one or several images of the second functional portion of the apparatus.

2. The system according to claim 1, wherein the portable user interface is arranged for enabling an input of information for controlling the apparatus by an operator.

3. The system according to claim 1, wherein the portable user interface has a display device mountable at the head of an operator in the form of glasses which are configured for visually reproducing the received information in at least a part of the visual field of the operator.

4. The system according to claim 3, wherein the portable user interface has a camera which is configured for capturing images of objects located in the visual field of the operator.

5. The system according to claim 3, wherein the portable user interface is configured for recognizing in the captured images a gesture made by the operator, including a hand gesture, and to derive therefrom corresponding information for controlling the apparatus.

6. The apparatus according to claim 5, wherein the portable user interface is configured for reproducing an input scheme, in the form of a keyboard or symbols, in the visual field of the operator and for recognizing in the captured images a gesture of an input and/or selection made by the operator with respect to the reproduced input scheme, and for deriving therefrom respective information for controlling the apparatus.

7. The apparatus according to claim 6, wherein the portable user interface has a projection device which is configured for projecting the input scheme onto an area.

8. The system according to claim 3, wherein the portable user interface is configured for capturing an image of an object located in the visual field of the operator, a transport container for value documents, and for ascertaining additional information located on the object with the help of the captured image.

9. The system according to claim 3, wherein the portable user interface is configured for capturing an image of an object located in the visual field of the operator, a separator card, and for ascertaining additional information located on the object with the help of the captured image.

10. The system according to claim 1, wherein the portable user interface is arranged as a mobile end device, which is configured for capturing at least one image of the apparatus and for reproducing the received information pertaining to the apparatus and/or the processing of the value documents together with the captured image of the apparatus.

11. The system according to claim 1, wherein the portable user interface includes a display device.

12. The system according to claim 1, wherein the portable user interface is arranged for enabling a selection of information for controlling the apparatus by an operator.

13. The system according to claim 1, wherein the portable user interface is configured to recognize in the captured images a gesture made by the operator.

14. The system according to claim 13, wherein the portable user interface is configured to derive from the gesture made by the operator corresponding information for controlling the apparatus.

15. The system according to claim 1, wherein the portable user interface is configured to recognize in the captured images a hand gesture made by the operator.

16. The system according to claim 15, wherein the portable user interface is configured to derive from the hand gesture made by the operator corresponding information for controlling the apparatus.

17. The system according to claim 1, wherein the portable user interface has a display device mountable to the head of an operator, wherein said display device includes a head-mounted display (HMD), a helmet display, or a virtual reality helmet (VR helmet).

18. The system according to claim 1, wherein the portable user interface includes a mobile end device.

19. The system according to claim 1, wherein the portable user interface is a tablet computer or smartphone.

20. A method for processing value documents, the method comprising:

processing value documents by conveying, checking, counting, and/or sorting the value documents in an apparatus, the apparatus including a first functional portion and a second functional portion, said first and second functional portions including a conveying portion, a checking portion, a counting portion, and/or a sorting portion configured to respectively convey, check, count, and sort the value documents in the processing of the value documents;

receiving information pertaining to each of the first functional portion and the second functional portion of the apparatus and/or the processing of the value documents at the first functional portion and the second functional portion by a portable user interface;

capturing one or several images of the first functional portion of the apparatus by the portable user interface;

reproducing the received information pertaining to the first functional portion of the apparatus or the processing of the value documents at the first functional portion and the captured one or several images of the first functional portion of the apparatus by the portable user interface such that the received information pertaining to the first functional portion of the apparatus is reproduced to spatially correspond with the first functional portion of the apparatus in the reproduced one or several images of the first functional portion of the apparatus; and reproducing the received information pertaining to the second functional portion of the apparatus or the processing of the value documents at the second functional portion and the captured one or several images of the second functional portion of the apparatus such that the received information pertaining to a second functional portion of the apparatus is reproduced to spatially correspond with the second functional portion of the apparatus in the reproduced one or several images of the second functional portion of the apparatus.

* * * * *